(12) United States Patent
Bernard

(10) Patent No.: US 9,219,285 B2
(45) Date of Patent: Dec. 22, 2015

(54) METHOD FOR THE EARLY DETECTION OF LIQUID WATER FORMATION IN A FUEL CELL

(75) Inventor: Jerome Bernard, Villigen (CH)

(73) Assignee: Belenos Clean Power Holding AG, Bienne (CH)

( * ) Notice: Subject to any disclaimer, the term of this patent is extended or adjusted under 35 U.S.C. 154(b) by 602 days.

(21) Appl. No.: 13/392,003

(22) PCT Filed: Aug. 26, 2010

(86) PCT No.: PCT/EP2010/062514
§ 371 (c)(1),
(2), (4) Date: Apr. 18, 2012

(87) PCT Pub. No.: WO2011/023781
PCT Pub. Date: Mar. 3, 2011

(65) Prior Publication Data
US 2012/0196201 A1  Aug. 2, 2012

(30) Foreign Application Priority Data

Aug. 27, 2009 (EP) .................................... 09168872

(51) Int. Cl.
*H01M 8/04* (2006.01)
(52) U.S. Cl.
CPC .......... *H01M 8/045* (2013.01); *H01M 8/04328* (2013.01); *H01M 8/04335* (2013.01); *H01M 8/04507* (2013.01); *H01M 8/04835* (2013.01); *Y02E 60/50* (2013.01)

(58) Field of Classification Search
CPC ............ H01M 8/045; H01M 8/04328; H01M 8/04335; H01M 8/04507; H01M 8/04835
USPC ......................................................... 429/442
See application file for complete search history.

(56) References Cited

U.S. PATENT DOCUMENTS

| 2003/0190512 A1 | 10/2003 | Takahashi et al. |
| 2007/0154750 A1 | 7/2007 | Ukai et al. |
| 2007/0202367 A1 | 8/2007 | Yoshida |
| 2009/0213896 A1* | 8/2009 | Morita et al. .................... 374/16 |
| 2009/0317678 A1* | 12/2009 | Bono ............................... 429/24 |

FOREIGN PATENT DOCUMENTS

WO   WO 2006/012953 A2   2/2006

* cited by examiner

*Primary Examiner* — Karie O'Neill Apicella
(74) *Attorney, Agent, or Firm* — Sughrue Mion, PLLC

(57) ABSTRACT

A method for the early detection of liquid water formation in a fuel cell (1), in which a fuel gas and an oxidant gas flow, delivered by a gas supply circuit (50) that has a control module (110). According to the invention, the method includes:
 monitoring the temperature change in one of said gases over time,
 detecting a variation in said temperature by measuring a temperature differential by unit of time and comparing it to a threshold value, and
 generating a signal representative of said detection via said control module (110).

6 Claims, 3 Drawing Sheets

METHOD FOR THE EARLY DETECTION OF LIQUID WATER FORMATION IN A FUEL CELL

This is a National Phase Application in the United States of International Patent Application PCT/EP 2010/062514 filed Aug. 26, 2010, which claims priority on European Patent Application No. 09168872.1. The entire disclosures of the above patent applications are hereby incorporated by reference.

FIELD OF THE INVENTION

The present invention relates to fuel cells, more specifically of the type designed to operate using hydrogen as the fuel and pure oxygen as the oxidant. It concerns, more specifically, a method of detecting liquid water formation in gas distribution circuits.

BACKGROUND OF THE INVENTION

Fuel cells produce electrical energy directly from an electrochemical oxygen reduction reaction from hydrogen as the fuel and oxygen as the oxidant. The operating principle is well known to those skilled in the art. Hydrogen gas (H2) brought into contact with an anode is converted into hydrogen protons (2H+) releasing two electrons (2e−), injected into an electric circuit. This is the hydrogen oxidation reaction. The hydrogen protons (2H+) then pass through a polymer membrane, or electrolyte, which separates them from a cathode. On coming into contact with the cathode, they are combined with oxygen gas (½O2) and two electrons (2e−), supplied by the electric circuit, to produce water (H2O). This is the oxygen reduction reaction. These electrochemical reactions generate an electric current, for operating an engine or motor, or charging a battery, and a reaction product, water.

FIG. 1 illustrates an exploded view of a fuel cell example that operates on the model described above. Fuel cell 1 is formed in a conventional manner of a basic cell 2 formed of two bipolar flow field plates 10, between which there is a membrane electrode assembly 11, whose structured is described below. The stack is then held between two end plates 20, 21, and forms a compact block that is held compressed by means of insulating pins 30, which extend from one end plate 20 to the other 21, and are fitted with nuts 40 at the ends thereof. Springs 50 mounted on the insulating pins and inserted between nuts 40 and end plates 20, 21, apply a compression force to the block parallel to the stacking direction. The hydrogen and oxygen gases are introduced and extracted from cell 1 using inlet and outlet connections that are not visible in plate 20. These connections are for connecting a gas supply circuit (not shown) and its control system, which is generally complex and voluminous.

Membrane electrode assemblies 11 (MEA), comprise a polymer membrane, which is electrically insulating but permeable to H+ ions. This membrane is arranged between an anode and a cathode formed of electrically conductive porous layers, at the core of which the electrochemical hydrogen oxidation and oxygen reduction reactions are produced. Said layers generally include a first gas diffusion sublayer and a second catalyst sublayer for the electrochemical reactions. Distribution channels 15 run over the faces of bipolar flow field plates 10 that come into contact with membrane electrode assemblies 11, ensuring that the gases are brought to and distributed on the active layers. The bipolar flow field plates 10 are formed of an electrically conductive material so as to collect the current generated by the hydrogen oxidation.

The operating principle of fuel cell 1 is simple but it is complex to implement. It is known, for example, that the ionic permeation of polymer membranes depends upon their water content. To operate properly, they must maintain a certain level of humidity at the core of the cell, by humidifying the injected gases. It is also known that the fuel cell reaction product is water. This water forms on the cathode side and then flows, as vapour, essentially in oxygen distribution channels 15. The presence of water in the fuel cell is thus both necessary and inevitable. However, it is problematic in that water vapour is liable to condensate and form drops that can, if they are numerous, block distribution channels 15 of one or more basic cells 2. The consequences, if the liquid water is not quickly removed, are a dramatic drop in the fuel cell's power and even destruction of the blocked cell. Monitoring the humidity level in fuel cell 1 and, more specifically liquid water formation, is consequently a significant factor in the operation thereof.

Some methods already exist for preventing water drops forming in the fuel cell distribution channels and optimising the level of humidity in the cell. One of these methods, disclosed in WO Patent Application No. 02006012953, essentially consists in checking the humidity level of the cell exhaust gases, then in removing a determined percentage of humid gas and re-injecting it at the cell inlet, after dehumidifying the remaining humid gas. This method is complex and expensive to apply. In order to be implemented, it requires a heavy and voluminous device. Moreover, it is not a method for specifically detecting liquid water formation in the cell distribution channels. Despite the checks carried out, it is not impossible for very localised temperature and pressure conditions to cause the formation of water droplets that are not immediately detected.

SUMMARY OF THE INVENTION

The present invention proposes, by way of alternative, or addition to a method of this type, a specific method for the early detection of liquid water formation in the fuel cell gas distribution channels. It concerns, more specifically, a method for the early detection of liquid water formation in a fuel cell, through which a fuel gas and an oxidant gas flow, delivered by a gas supply circuit, which has a control module. According to the invention, the method includes:

monitoring the temperature change in one of said gases over time, detecting a variation in said temperature by measuring a temperature differential by unit of time and comparing it to a threshold value, and generating a signal representative of said detection via said control module.

As will be seen below, the method according to the invention allows liquid water formation to be detected early, which prevents all the inconvenient consequences of that phenomenon.

BRIEF DESCRIPTION OF THE DRAWINGS

Other features and advantages of the present invention will appear from the following description, which is given with reference to the annexed drawings and provides, by way of explanatory, but non-limiting example, a description of the detection method according to the invention. In the drawings.

DETAILED DESCRIPTION OF THE PREFERRED EMBODIMENTS

Figure 1:
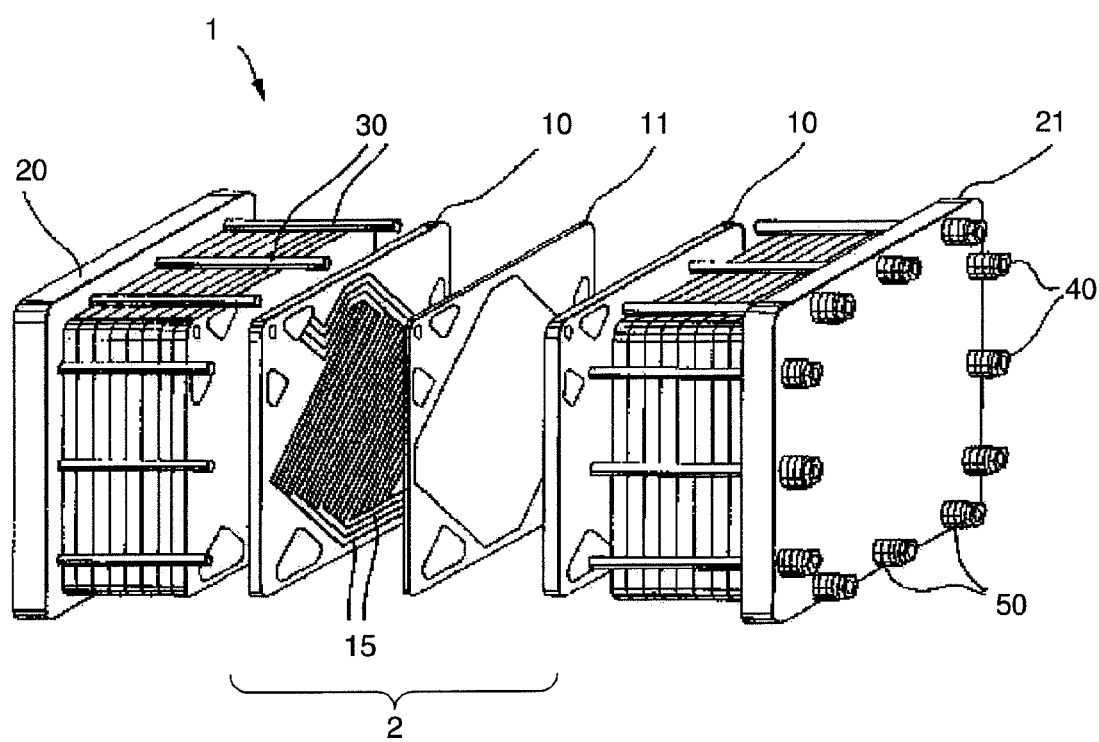
FIG. 1 illustrates an exploded view of a fuel cell discussed in the background section above.
Figure 2:
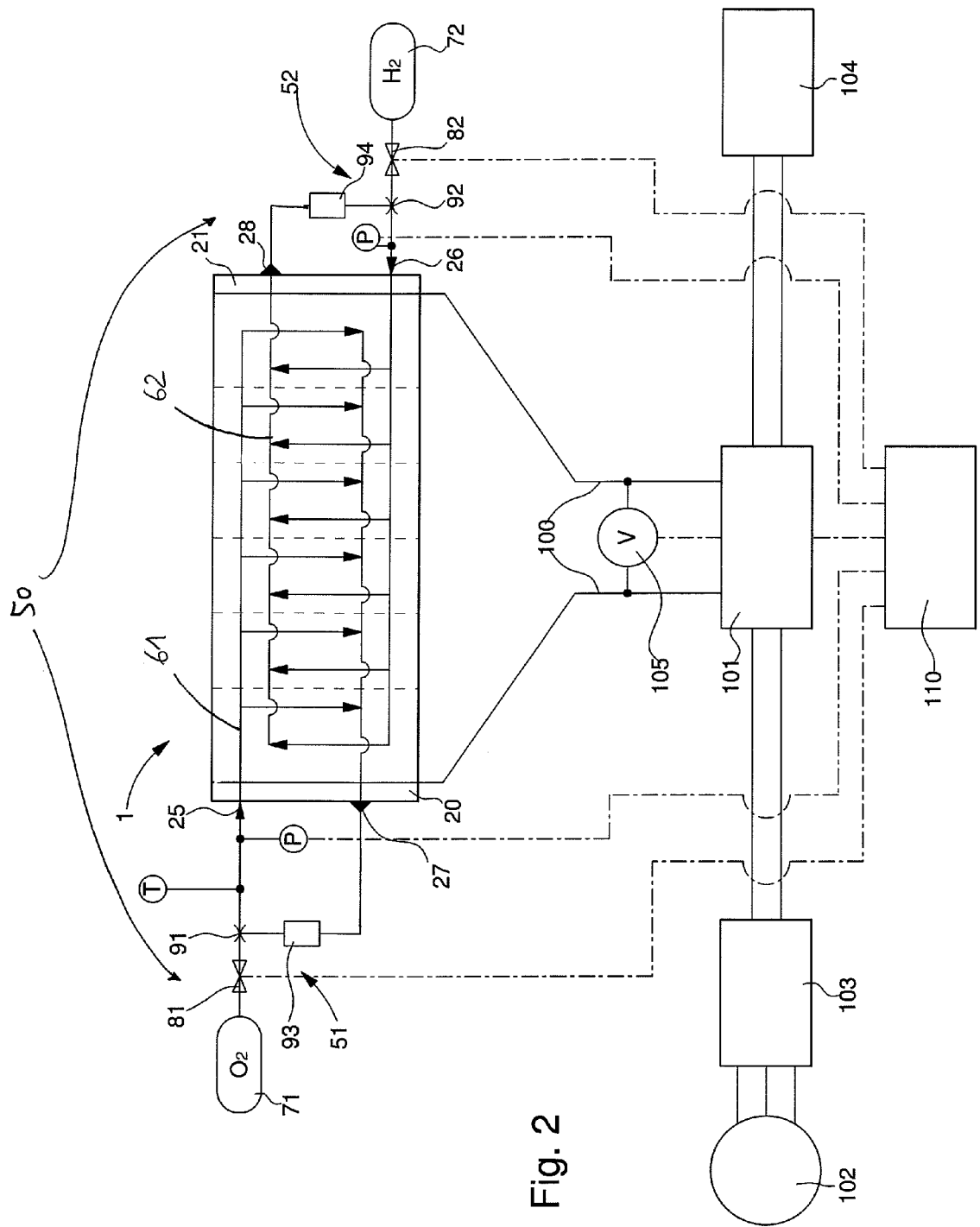
FIG. 2 is a schematic view of a fuel cell that can be used for implementing a detection method according to the invention.

The method of detecting liquid water formation according to the invention is applied to a fuel cell 1 of the type described above. FIG. 2 shows this cell 1 schematically, with its gas supply circuit 50. Circuit 50 includes, in a conventional manner, a first, oxygen supply sub-circuit 51 and a second, hydrogen supply sub-circuit 52 connected to end plates 20 and 21 of cell 1 by inlet connections 25, 26 and outlet connections 27, 28. Each supply sub-circuit 51, 52 forms, with distribution channels 15 of each of the two gases, a closed flow loop, respectively 61 and 62, in which one of the reaction gases, at a pressure typically of between 2 and 3 bars, and the reaction product both flow. Supply sub-circuits 51, 52 have pressurised tanks 71, 72, for supplying each of flow loops 61, 62 with fresh gas, which are opened and closed via electromechanical valves 81, 82. They are also fitted with flow pumps 91, 92, such as Bernouilli effect pumps, with an inlet for the fresh gas, and used for recirculating the reaction gases and mixing them with fresh gas. Pressure sensors P are arranged on the supply sub-circuits 51, 52, preferably in proximity to inlet connections 25, 26 of cell 1.

The oxygen and hydrogen supply sub-circuits, respectively 51, 52, also include means (not shown) for humidifying the reaction gases, located between gas tanks 71, 72 and flow pumps 91, 92. They also include devices for evacuating the reaction product, water, such as condensors 93, 94, which are arranged at the outlet of cell 1, between outlet connections 27, 28 and flow pumps 91, 92. A temperature sensor T is arranged on one of the gas supply sub-circuits 91, 92, preferably on the oxygen supply sub-circuit 51, at the inlet of fuel cell 1, between flow pumps 91, 92 and inlet connections 25, 26.

Fuel cell 1 is connected to an electric power line 100 to which it delivers the electric current that it generates. Electric line 100 conveys the current produced by cell 1 to a power control unit 101, which is connected to an electric motor 102, via a DC/AC converter 103, and to an electric energy storage device 104, such as a lithium battery. Depending upon the power consumption of the electric motor, the electric energy is distributed either to electric motor 102, or to storage device 104. A voltameter 105, mounted on power line 100, is for measuring the output voltage from cell 1.

Gas supply circuit 50 is controlled by a control module 110, which receives the data from pressure sensors P, temperature sensor T, and voltameter 105. Depending upon the data received, it controls injection of fresh gas by adjusting the opening of electromechanical valves 81, 82, so as to permanently optimise the operation of fuel cell 1.

According to the invention, the method of detecting liquid water formation in a fuel cell 1 of the type described above, relies upon measuring the temperature of the reaction gases, using temperature sensor T.

Figure 3A:
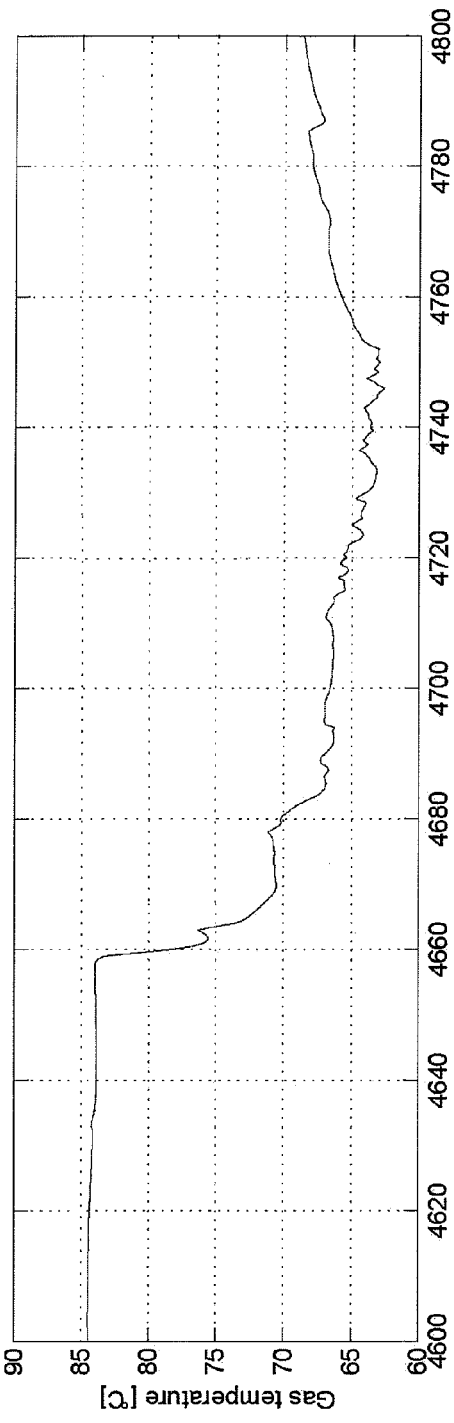
FIGS. 3a and 3b show the change over time in the cell's operating parameters.
Figure 3B:
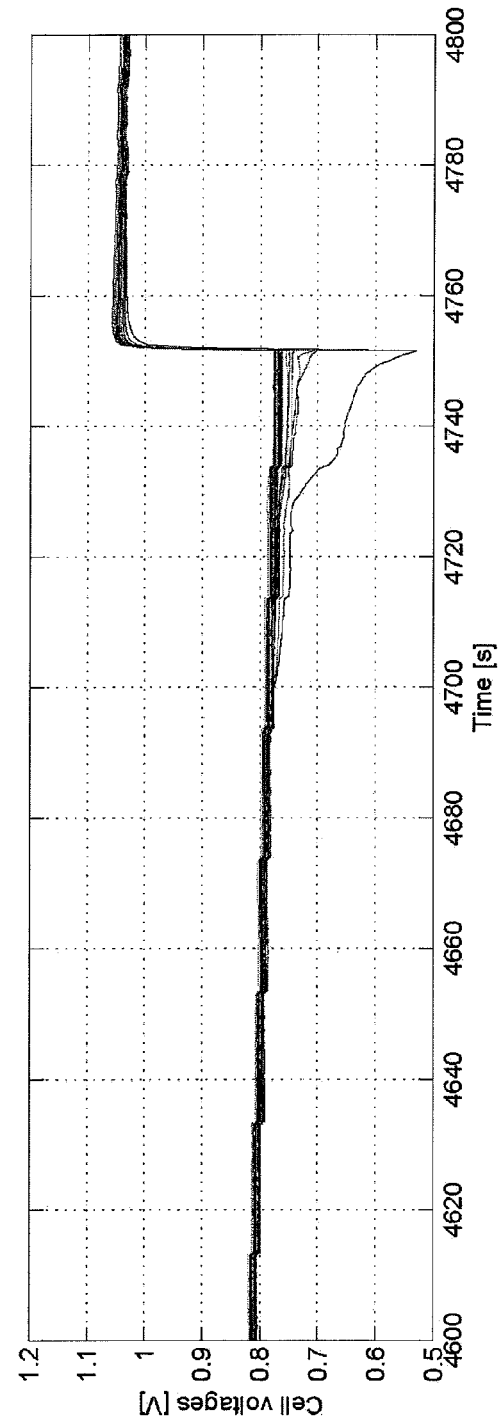

Monitoring this temperature measurement over time means that liquid water formation in the gas flow loops 61, 62 can be detected early. FIGS. 3a and 3b respectively illustrate the change in temperature of the oxygen at the inlet of cell 1, and in the voltage at the basic cell terminals, over time. The voltage at the terminals of a basic cell provides information as to its electrochemical activity.

It can be observed in FIGS. 3a and 3b that the rapid decrease in activity of one of the basic cells, illustrated in graph 3b by the temperature drop at its terminals, is preceded in time by an abrupt variation in the oxygen gas temperature at the inlet to cell 1. This abrupt temperature variation occurs approximately 40 to 60 seconds prior to the start of the gradual cessation of the cell's activity, caused by the accumulation of liquid water in distribution channels 15. The speed is around 4 to 5 degrees per second, i.e. 4 to 6 percent variation per unit of time. This variation is much quicker than the variations in gas temperature measured in normal operating conditions. The same phenomenon was observed when measuring, this time, the change in the hydrogen gas temperature. Without offering any physical explanation for this phenomenon, it is observed that it is sufficiently marked and reproducible to predict, early on and with a sufficient degree of certitude, liquid water formation in gas supply circuit 50, and in particular in a distribution channel 15. It is to be noted that the observed temperature variation is a drop, but, from experience, the possibility of the variation also taking the form of an abrupt increase cannot be excluded.

In practice, detection of a temperature variation in a reaction gas, which is characteristic of liquid water formation in cell 1, is achieved by monitoring the temperature over time, measuring a temperature differential by unit of time and comparison with a threshold value above which the temperature drop is deemed representative. This calculation is typically carried out by control module 110, which generates, in the event of detection, a liquid water detection signal.

The period of time between the temperature drop in one of the reaction gases, and liquid water accumulation in cell 1, is sufficiently long for corrective action to be undertaken to prevent the problem of distribution channels 15 being blocked and any consequences on the operation of fuel cell 1, such as the cell stopping or being damaged. Gas supply circuit 50 can thus be purged, by opening valves located for this purpose at the outlet of cell 1. The effect of the purge is to drive out the excess humidity and even any droplets in suspension in sub-circuits 51, 52 and distribution channels 15. The purge is possible because the pressure in gas supply circuit 50 is higher than the atmospheric pressure. By way of alternative to a purge, the flow of reaction gases could be accelerated, using flow pumps 91, 92, which produces an approximately similar effect to a purge. This solution is preferred when the reaction gas pressure in supply circuit 50 is lower than the atmospheric pressure. The corrective action can be set in place automatically by control module 110.

A method for the early detection of liquid water formation in a fuel cell has thus been described. The above description is of one embodiment of the invention and should in no way be considered as limiting, more specifically as regards the structure described for the device implementing the method. The detection method according to the present invention can be implemented in any fuel cell that uses an oxidant and a fuel. Those skilled in the art will not encounter any particular difficulty in adapting the method according to the invention to their particular requirements, particularly as regards the values provided by way of example for the temperature variation speed and the time period between the temperature drop and malfunction of a cell. These values can vary from one cell to another, depending upon the configuration of the cell.

The invention claimed is:

1. A method for the early detection of a formation of liquid water droplets in a fuel cell, in which a fuel gas and an oxidant gas flow, delivered by a gas supply circuit that has a control module, wherein said method includes:

monitoring the temperature change in one of said gases over time, detecting a variation in said temperature by measuring a temperature differential by unit of time and comparing it to a threshold value, and generating a signal representative of said detection via said control module, the signal being representative of detection of the formation of liquid water droplets in gas distribution channels in the fuel cell, wherein said temperature variation is a drop.

2. The detection method according to claim 1, wherein the speed of said temperature drop is higher, in percentage, than the temperature variation speed of the cell during normal operation.

3. The detection method according to claim 2, wherein the speed of said temperature drop is around 4 to 6 percent per second.

4. The detection method according to claim 1, wherein said temperature is measured for the oxidant gas.

5. The detection method according to claim 4, wherein said temperature is measured in the oxidant gas supply circuit, which comprises a flow pump and an inlet connection to the fuel cell.

6. The detection method according to claim 4, wherein said temperature is measured between said flow pump and said inlet connection.

* * * * *